J. C. HASBROUCK, Jr.
FLIGHT RETARDER OR BRAKE FOR AIRSHIPS.
APPLICATION FILED JULY 6, 1917.
1,274,037.
Patented July 30, 1918.
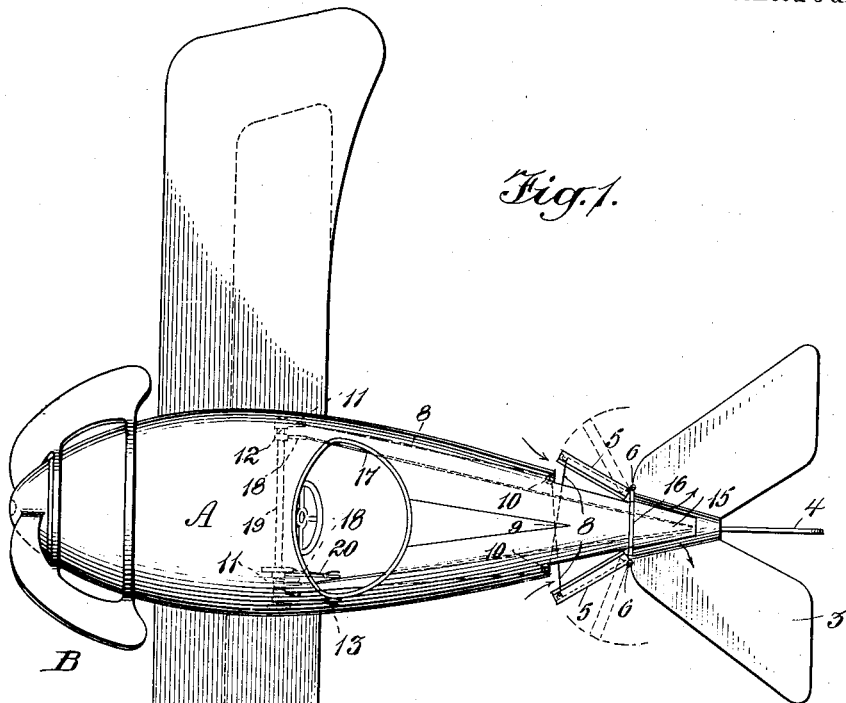
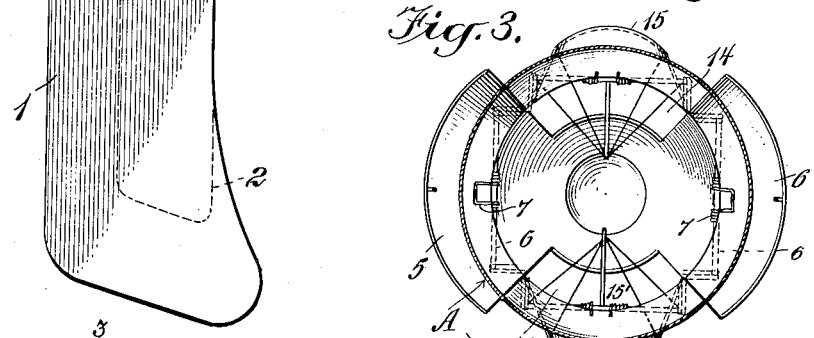
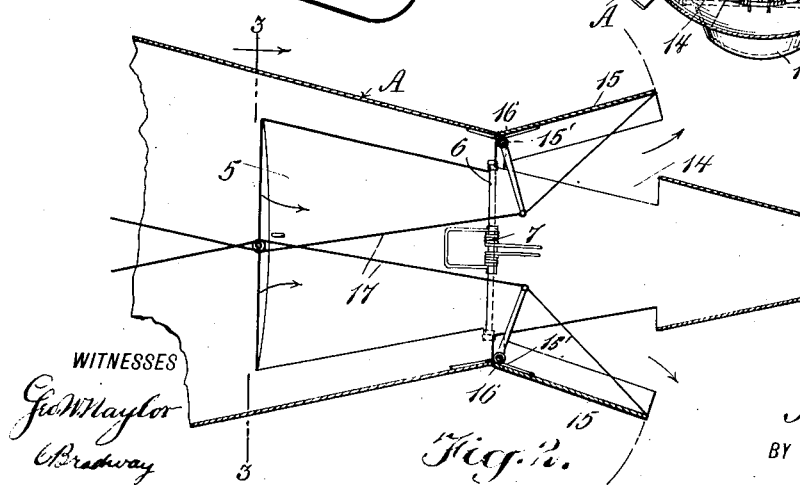
WITNESSES
INVENTOR
J. C. Hasbrouck, Jr.
BY
ATTORNEYS

UNITED STATES PATENT OFFICE.

JOHN C. HASBROUCK, JR., OF NEW YORK, N. Y.

FLIGHT-RETARDER OR BRAKE FOR AIRSHIPS.

1,274,037.  Specification of Letters Patent.  Patented July 30, 1918.

Application filed July 6, 1917. Serial No. 178,912.

*To all whom it may concern:*

Be it known that I, JOHN C. HASBROUCK, Jr., a citizen of the United States, and a resident of the city of New York, borough of Manhattan, in the county and State of New York, have invented a new and Improved Flight-Retarder or Brake for Airships, of which the following is a full, clear, and exact description.

This invention relates to a flying machine and deals particularly with a brake means under the control of the operator whereby the flight of the airship can be arrested to any desired degree, and also a low landing speed attained.

The invention has for its general objects to provide a brake device which is of comparatively simple and inexpensive construction, reliable and efficient in use and so designed as to effectively arrest the flight of the airship without disturbing its stability.

A more specific object of the invention is the provision of a brake element in the form of drag fins or planes which are adapted to swing laterally from the sides of the body adjacent the tail end thereof, so as to oppose the forward travel of the airship to any desired extent, according to the degree of opening or outward movement of the brake elements, which latter are operated by suitable means under the control of the aviator.

A further object of the invention is the provision of vent valves at the tail end of the airship body to reduce the pressure on the brake elements and thereby facilitate the closing of the latter by the operator.

With such objects in view and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a plan view of an aeroplane with the brake or drag members in partially open position to brake the forward flight of the airship;

Fig. 2 is a vertical longitudinal section of the rear end of the airship body showing the venting valves and one of the brake members open;

Fig. 3 is a transverse section on the line 3—3, Fig. 2.

In the present instance the invention is shown in connection with a bi-plane airship, but it is to be understood that it is not necessarily limited to this type of flying craft.

Referring to the drawing, A designates the flying machine body, preferably of the shell or closed type, and in shape conforms to stream-line principles, there being a propeller B at the front and upper and lower supporting planes 1 and 2. At the rear is an adjustable elevating plane 3 and a rudder 4, both of which are controlled in the usual manner.

The braking device for retarding the forward flight of the airship comprises a pair of drag elements or fins 5 disposed at opposite sides of the body with their rear edges 6 hinged to the body and their front edges free. Suitable spring means 7 operates on each drag element 5 to swing the latter outwardly from a closed position flush with the sides of the body. The brake drag elements are adapted to be drawn inwardly to closed position by any suitable means, such as cables 8, Fig. 1, which cross each other at 9 and pass over guide devices 10, and thence forwardly to arms 11 on an operating shaft 12, which has an actuating lever 13. Thus, by moving the lever in one direction the brake or drag members 5 are drawn inwardly while the movement of the lever in the opposite direction allows the brake elements to swing outwardly to any desired extent, whereby the flight of the aeroplane is retarded, or a safe landing speed secured.

To facilitate the closing or complete retraction of the brake elements 5 it may be desirable to vent the rear closed end of the body, and for this purpose the body has upper and lower openings 14 which are adapted to be closed by swinging vent valves 15 hinged at their forward edges 16 to the body. Springs 15', similar to the springs 7, may be employed to assist in the opening of the vent valves. Pull cables 17 connected with the arms 18 on a hollow shaft 19 are employed to close the vent valves, such hollow shaft being actuated by an operating lever 20 which, like the lever 13, is adjacent the aviator's seat. When the brake elements are in open position the air pressure on the front faces thereof is considerable and to relieve this pressure the vent valve is opened, whereby the air passes into the body from the brake elements 5 and out of the body through the openings 14. The air passes out of both openings so that there will be no disturbing effect on the stability of the machine.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An airship including a body, means for propelling and sustaining the same, brake elements arranged at opposite sides of the body with the rear edges hinged thereto and the front edges free to move outwardly from and inwardly to a position flush with the sides of the body, and vent means located between the brake elements.

2. An airship including a body, means for propelling and sustaining the same, brake elements arranged at opposite sides of the body, and a valve-controlled vent means located between the elements.

3. An airship including a body, means for propelling and sustaining the same, said body having openings in its rear portion, brake elements arranged at the openings to swing outwardly for retarding the flight of the airship, means controlling the brake elements, and an adjustable vent means located in the body at a point between the said brake elements.

4. A flying machine including a shell-like body, means for sustaining the body, means for propelling the body, braking members adapted to be projected from the sides of the body to retard the flight of the flying machine, there being vent openings in the body at a point behind the members, and manually controlled valves for the vent openings.

5. A flying machine including a shell-like body, means for propelling the same, sustaining planes, said body having lateral openings and top and bottom openings, manually controlled brake elements projectable from the lateral openings for retarding the flight of the flying machine, and manually controlled vent valves for the top and bottom openings, whereby the air pressure on the braking members is relieved through the said top and bottom openings.

6. An airship including a closed body having side openings adjacent its rear and top and bottom openings behind the side openings, brake elements having their rear ends hinged to the rear edges of the side openings and their front ends movable outwardly, and vent valves for the top and bottom openings.

7. An air ship including a closed body having sets of oppositely disposed openings arranged one set behind the other, brake elements having their rear ends hinged to the rear edges of the front set of openings and their front ends movable outwardly, means for operating the brake elements, vent valves having their front edges hinged to the front edges of the rear openings, with their rear ends movable outwardly, and means for operating the vent valves.

JOHN C. HASBROUCK, Jr.